May 5, 1942.  E. SCHENK  2,281,805

METHOD OF ELECTRIC WELDING

Filed April 28, 1941

INVENTOR
Eduard Schenk
By Archworth Martin
His Attorney

Patented May 5, 1942

2,281,805

UNITED STATES PATENT OFFICE 2,281,805

METHOD OF ELECTRIC WELDING

Eduard Schenk, Oakdale, Pa.

Application April 28, 1941, Serial No. 390,688

5 Claims. (Cl. 219—10)

My invention relates to a method of welding electrically. One method frequently employed in the welding of metals consists in creating an arc for softening the metal parts to be joined and then pressing the parts together, or for melting a weld rod from which molten metal will flow to the weld seam or joint. One of the objections to such methods arises out of the fact that difficulty is experienced in preventing excessive oxidation of the metal, and, furthermore, metal which has been melted by an arc frequently is weaker and spongy and contains blow holes and impurities. Also, it is too hard to be machined and must be ground.

Another method which is practiced involves the setting up of a sufficient current flow in the metal parts to be welded together, by induction or otherwise, and is known as resistance welding. Some of the objections to this procedure are the unnecessary heating of large areas of metal at points somewhat remote from the zone of the weld, excessive amount of electrical energy required, and the great length of time required to soften the parts which are to be joined.

One object of my invention is to provide a method whereby welded joints can readily be effected electrically without substantial change in the physical or chemical character of the welded parts.

Another object of my invention is to provide a method whereby welding may be effected quickly and with a minimum consumption of electric current.

Still another object of my invention is to provide a method whereby metal elements which are spaced slightly apart can effectively and quickly be joined by an electric welding operation, by completely filling in at the weld area with pure metal that is drawn into the weld joint, without the necessity of pushing the parts into engagement with one another, and also by largely excluding the atmosphere which has a deleterious effect on the weld.

In practicing my invention I make use of the phenomenon that alternating electrical currents in flowing through conductors in the manner contemplated by my invention are of greatest intensity at the surfaces thereof, and I have discovered that this tendency can be utilized effectively in the art of electric welding.

Figure 1:
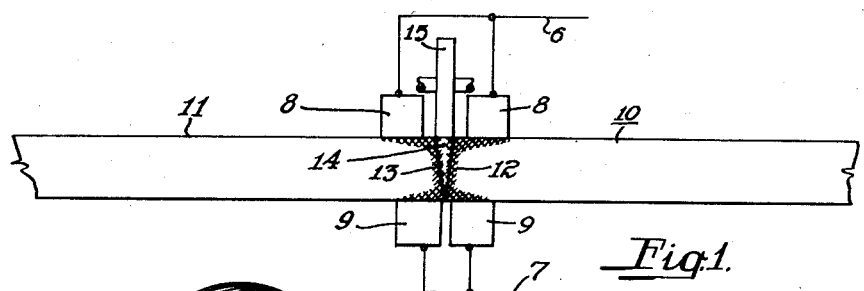
Figure 2:
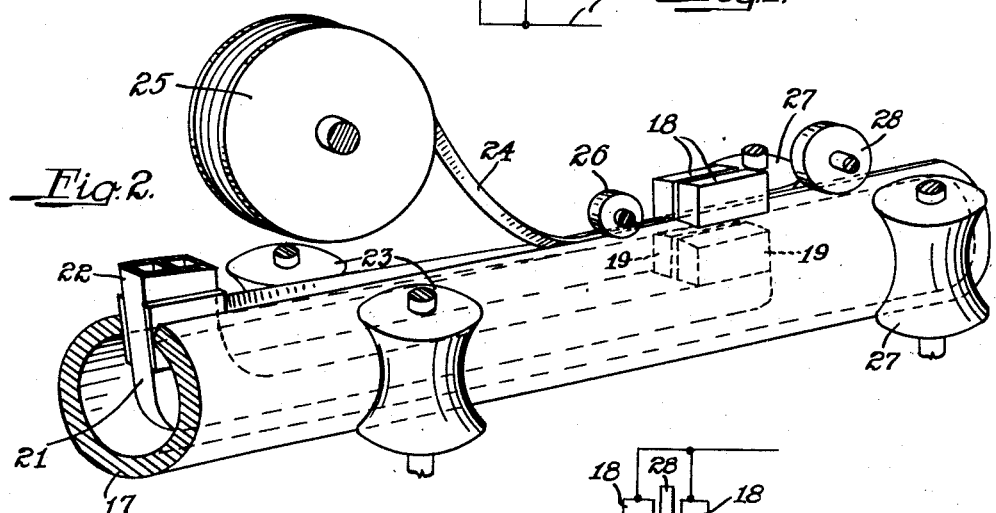
Figure 3:
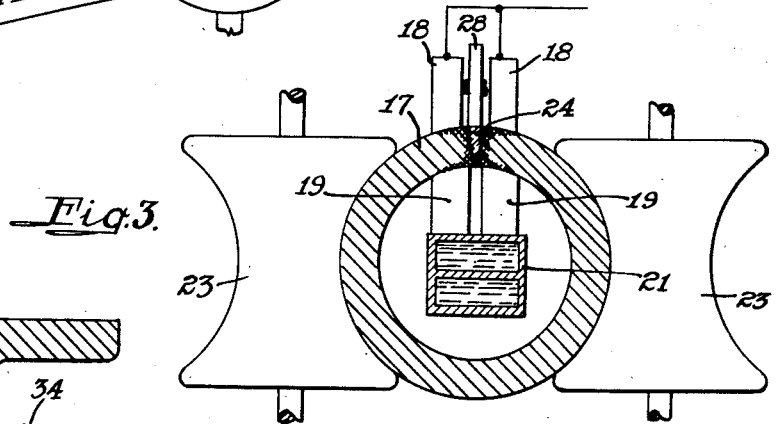
Figure 4:
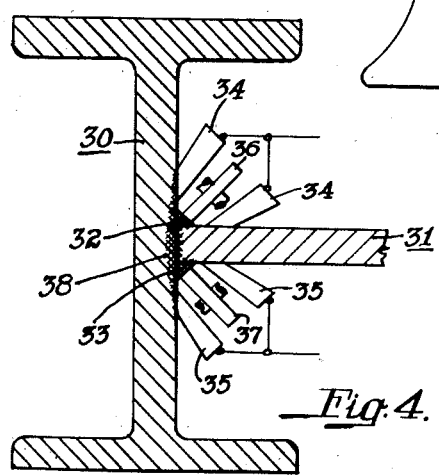
Figure 5:
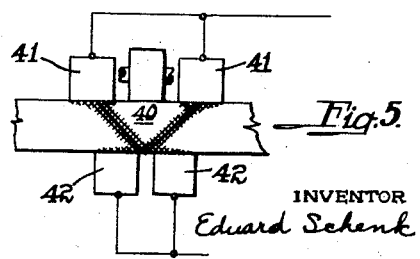

In the accompanying drawing, Figure 1 is a schematic view showing a manner in which I propose to electrically weld two bars or plates together; Fig. 2 is a perspective view showing a manner in which my invention may be employed in the making of metal tubes; Fig. 3 is a cross-sectional view thereof; Fig. 4 shows a manner in which structural members may be welded together in situ, and Fig. 5 is a modification of the arrangement of Fig. 1.

The tendency of alternating electrical current flow to be greater at the surfaces of conductors than at the interior sections thereof, is known in the art as the "skin effect." In the practice of my invention, I utilize this phenomenon and also arrange the conductor electrodes and the surfaces to be welded in such manner that there will be, in effect, current sheets flowing along the surfaces to be welded together, in such proximity that there will be a magnetic pull between the two current sheets or the current flows in the divided paths. The current flow through these paths must always be in the same direction at any given instance, and the magnetic linkage pull or attraction of the current in the adjacent paths tends to draw the conductors toward one another, besides further concentrating the current flow to the desired paths. This magnetic pull not only tends to concentrate the current flow at the area of weld, but also causes the softened metal areas to unite or knit together very effectively, through the pulling of added softened metal into the spaces between the members to be welded.

Referring first to Fig. 1, I show A. C. conductors 6 and 7 connected with pairs of electrodes 8 and 9 respectively. These electrodes are preferably of a material such as tungsten, having high melting temperature as compared to metal work pieces 10 and 11 which are to be joined. The electrodes may be in the form of blocks or in the form of rollers, if the latter form is preferred where it is desired to continuously weld traveling work pieces.

By reason of the skin effect referred to, the current flow from the electrodes 8 to the electrodes 9, and in the reverse direction, will be most intense in paths indicated by the shading at 12 and 13 and concentration of the current in these paths will be still further increased by reason of the magnetic attraction above referred to. As a result, not only will there be rapid heating and softening of the metal immediately at the surfaces to be welded, but there is a saving in current required, because there is no great amount of heating of the metal at points substantial distances from the areas at 12 and 13.

The work pieces 10 and 11 are chamfered at their inner edges, as is usual in arc-weldrod methods, for insuring the deposit of metal throughout the joint. A bar 14, which usually will be of the same character of metal as the members 10 and 11, will be inserted between the chamfered surfaces. The electrical current will flow in these surfaces as indicated at 12 and 13 and will cause the bar 14 to melt, and it will be drawn into the weld seam, between the edges of the members 10 and 12. A roller 15 or the like will usually be employed to press the bar 14 into place. As the metal becomes softened in the abutting surfaces of the members 10, 14 and 11, the softened metal of these members will unite and the joining of the metals will be more effective because of the magnetic attraction, than is the case where surfaces are heated in some other manner and dependence is placed largely upon mechanical external pressure in order to join them together. Furthermore, by my method there is less extrusion and forming of burrs of weld metal than where mechanical pressure is largely depended upon to unite softened surfaces.

Referring now to Figs. 2 and 3, I show a manner in which the edges of pipe skelp may be welded together, without the necessity of employing a great force to squeeze the heated edges together, which not only frequently deforms the pipe, but causes undesirable extrusion of the softened metal. Usually when a plate is bent to pipe-skelp form, the inner longitudinally-extending corners of the skelp come into engagement with one another while the outer corners are a considerable distance apart, as shown in Fig. 3, and great force is required to bring the surfaces of the edges into parallel planes and into abutting engagement with one another. This is particularly true when working with cold skelp, and if the pressing operation is performed after the edges have been softened, there is considerable displacement and extrusion of softened metal at the seam.

In the present instance, a pipe skelp is indicated by the numeral 17, which may be welded when cold, except for the heating of the edges as hereinafter referred to, or while still retaining some of the heat to which it was subjected during the bending operation. To this end I provide outer electrodes 18 and inner electrodes 19 that correspond to the electrodes 8 and 9 of Fig. 1, and which may suitably be in the form of rollers. The electrodes 19 can be supported upon a conductor bar 21 that has passageways for the flow of cooling fluid, if desired, and is insulated on those areas which come into contact with the skelp. The bar extends upwardly as indicated at 22, between the edges of the pipe skelp, and is connected with an electrical supply line and supported by a suitable bracket, not shown. The edges of the skelp may initially be spaced apart a distance sufficiently to receive the bar portion 22 between them, or they may initially be formed with the inner corners of the skelp edges in abutting engagement and spread apart to receive the member 22. In any event, presser rolls 23 are provided at opposite sides of the skelp to bring or hold the inner corners thereof in close proximity to one another or abutting, as shown in Fig. 3.

Into this wedge-shaped space between the edges of the skelp, I introduce a filler strip 24 that is of wedge form as is the bar 14 and which may be drawn from a storage reel 25 as the pipe skelp moves along. Roller 26 presses the strip 24 into place between the skelp edges and holds it there while it passes the electrodes. Rollers 27 are provided for maintaining the edges of the skelp in place while the weld metal is cooling. The pressure exerted by these rollers usually will not be so great as to squeeze the skelp edges toward one another to a substantial degree, and the use of a filler strip avoids the necessity for such practice. The rollers 23 and 27 may also serve to feed the skelp forwardly past the electrodes. A roller 28 bears against the pipe at the seam line to smooth or iron out any extruded metal and to also press the strip 24 more snugly to its seat between the pipe edges should it not be fully seated when passing the electrodes.

The phenomena here are the same as described in connection with Fig. 1, namely, the utilization of the skin effect and the magnetic attractive forces resulting from the current flowing through the electrodes always in the same direction at any given instant.

In Fig. 4 I show the uniting of structural members 30 and 31 in generally abutting relation, although the surfaces to be united may be spaced apart some considerable distance. The method by which I unite the members will be particularly useful not only where the ends of two fixed members are to be united, but in the structural framework where it is desired to connect two structural members such as 30 by a member such as 31. In this instance, I employ two wedge-shaped filler members 32 and 33, although in some instances one member will be sufficient. Pairs of electrodes 34 and 35 are employed and alternating current supplied thereto from any suitable source. These electrodes are brought into engagement with the members 31 and 32, and may also engage the filler members 32 and 33, so that there will be concentration of current flow as indicated by the shaded lines at 38. Rollers or other suitable presser members 36 and 37 are provided for holding the filler pieces 32 and 33 in place and slight pressure may be applied to facilitate the uniting of the softened surfaces.

In the practice of my invention, commercial voltages and frequencies of 110 volts, and 60 cycle A. C. current may suitably be employed through a suitable autotransformer for raising the current to 3,000 amps., it being obvious, however, that other frequencies, voltage and amperage may be employed.

With current of the above value supplied, I have found that the abutting surfaces of the work pieces will be raised to a dripping white heat very quickly. Thus in welding together the edges of two blocks each one inch thick, three inches wide and four inches long, supported in an available lathe feed, it was difficult to shift the lathe feed rapidly enough to prevent the electrodes sinking into the blocks while moving the blocks between the electrodes, which indicated a very superior heating heretofore unknown. Further, the welding operation can be conducted so rapidly and with such small loss of heat that with the abutting edges at a dripping white heat the blocks could be touched by a person's finger at a distance only three inches from the zone of weld, without injury.

Fig. 5 shows an arrangement that may be employed where larger filler bars 40 are employed. In this arrangement the electrodes 41 partially overlie the bar 40 as well as the work pieces, so that current that flows through the electrodes 41 and 42 will flow also across the sides of the bar 40 as well as across the chamfered edges of the plates to be welded.

Where a large filler bar is employed as in Fig. 5, it will not necessarily be completely melted in order to complete the joint.

This application is a continuation in part of my application Serial No. 239,116, filed Nov. 5, 1938, for Method of electric welding.

I claim as my invention:

1. The method of welding which comprises so placing two metal members that their areas to be joined are in proximity to one another but spaced apart for the reception of filler metal, placing a metallic filler at said areas and directing a flow of alternating electrical current across said areas, from a pair of electrodes positioned against one face of the said members, at opposite sides of the space to be filled and in proximity to the adjacent edges of said areas, and through a similar pair of relatively-spaced electrodes disposed against the opposite face of said members and at the adjacent edges of said areas, the current flow across the said areas being always in the same direction at any given instant and maintained until the said areas and the filler metal become soft, the current frequency being such that there is magnetic concentration of current flow between the areas to be joined.

2. The method of welding which comprises so placing two metal members that their areas to be joined are in proximity to one another but spaced apart for the reception of filler metal, placing a metallic filler at said areas and directing a flow of alternating electrical current across said areas, from a pair of electrodes positioned against one face of the said members, at opposite sides of the space to be filled and in proximity to the adjacent edges of said areas, and through a similar pair of relatively-spaced electrodes disposed against the opposite face of said members and at the adjacent edges of said areas, the current flow across the said areas being always in the same direction at any given instant and maintained until the said areas and the filler metal become soft, and simultaneously imparting relative traveling movement to said metal members and the electrodes, in a direction longitudinally of the weld seam, the current frequency being such that there is magnetic concentration of current flow between the areas to be joined.

3. The method of welding which comprises so placing two metallic members that their areas to be joined are in proximity to one another, but in relatively flared relation in a direction outwardly of the members, placing a metallic filler between said areas and directing a flow of alternating electrical current across said areas, from a pair of electrodes positioned against one face of the said members, at opposite sides of the space to be filled and in proximity to the adjacent edges of said areas, and through a similar pair of relatively-spaced electrodes disposed against the opposite face of said members at the adjacent edges of said areas, the current flow across said areas being always in the same direction at any given instant and maintained until the said areas and the filler metal become soft, the current frequency being such that there is magnetic concentration of current flow between the areas to be joined.

4. The method of welding the edges of pipe skelp which, when bent to cylindrical form, having an outwardly-flared space between said edges which are in approximately abutting engagement at their inner corners, which comprises inserting filler metal between said edges and directing a flow of alternating electrical current radially across said edges, from a pair of electrodes positioned at opposite sides of the space between the said edges and in proximity to the outer corners of said edges, and through a pair of relatively spaced electrodes disposed adjacent to the inner corners of said edges, the current flow across the said edges being always in the same direction at any given instant and maintained until the said edges and the filler metal become soft, the current frequency being such that there is magnetic concentration of current flow between the areas to be joined.

5. The method of welding the edges of pipe skelp which, when bent to cylindrical form, has its edges in proximity to one another, but spaced apart for the reception of filler metal, placing a metallic filler between said edges and directing a flow of alternating electrical current radially across said edges, from a pair of electrodes positioned at opposite sides of the space between the said edges and in proximity to the outer corners of said edges, and through a pair of relatively spaced electrodes disposed adjacent to the inner corners of said edges, the current flow across the said edges being always in the same direction at any given instant and maintained until the said edges and the filler metal become soft, the current frequency being such that there is magnetic concentration of current flow between the areas to be joined.

EDUARD SCHENK.